United States Patent
Wang

(10) Patent No.: US 11,436,710 B2
(45) Date of Patent: Sep. 6, 2022

(54) METHOD AND DEVICE FOR MAPPING LDR VIDEO INTO HDR VIDEO

(71) Applicant: Samsung Electronics Co., Ltd., Suwon-si (KR)

(72) Inventor: Zuolong Wang, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 17/076,242

(22) Filed: Oct. 21, 2020

(65) Prior Publication Data
US 2021/0398257 A1    Dec. 23, 2021

(30) Foreign Application Priority Data

Jun. 18, 2020 (CN) .......................... 202010559814.4

(51) Int. Cl.
*G06T 5/00* (2006.01)
*G06V 20/40* (2022.01)
*G06V 10/48* (2022.01)
*G06T 9/00* (2006.01)

(52) U.S. Cl.
CPC ................ *G06T 5/007* (2013.01); *G06T 9/00* (2013.01); *G06V 10/48* (2022.01); *G06V 20/46* (2022.01)

(58) Field of Classification Search
CPC .......... G06T 5/007; G06T 9/00; G06V 20/46; G06V 10/48

USPC ......................................................... 382/100
See application file for complete search history.

(56) References Cited

U.S. PATENT DOCUMENTS

| 9,607,364 | B2 | 3/2017 | Xu et al. |
| 10,062,152 | B2 | 8/2018 | Choudhury et al. |
| 2011/0188744 | A1* | 8/2011 | Sun .......................... G09G 5/10 382/162 |
| 2018/0115742 | A1 | 4/2018 | Guermoud et al. |
| 2018/0130188 | A1* | 5/2018 | Farrell ....................... G06T 7/90 |

FOREIGN PATENT DOCUMENTS

KR    10-2083166 B1    3/2020

* cited by examiner

*Primary Examiner* — Wednel Cadeau
(74) *Attorney, Agent, or Firm* — Jefferson IP Law, LLP

(57) ABSTRACT

A method for mapping a low-dynamic range (LDR) video into a high-dynamic range (HDR) video and a device therefor are provided. The method includes a modeling process, and a mapping process. The modeling process includes training according to LDR videos of at least three different exposure levels to obtain a highlight reconstruction model and an exposure generation model, and the mapping process includes mapping an LDR video to be processed into an HDR video through the highlight reconstruction model and the exposure generation model. Accordingly, solutions to the problems of a multi-exposure synthetic image being too dark or too light is provided, and jitter in video synthesis, are provided.

8 Claims, 6 Drawing Sheets

METHOD AND DEVICE FOR MAPPING LDR VIDEO INTO HDR VIDEO

CROSS-REFERENCE TO RELATED APPLICATION(S)

This application is based on and claims priority under 35 U.S.C. § 119 of Chinese patent application number 202010559814.4, filed on Jun. 18, 2020, in the China National Intellectual Property Administration, the disclosure of which is incorporated by reference herein in its entirety.

BACKGROUND

1. Field

The disclosure relates to a method and device for mapping low-dynamic range (LDR) video into high-dynamic range (HDR) video.

2. Description of the Related Art

With the development of display manufacturing industry, consumers' experience on high-quality high-dynamic range (HDR) contents has become a popular direction for future development. However, the shooting of the high-quality HDR contents is expensive and requires complicated processing procedures, so the barrier is relatively high. In order to solve the problems of shortage and high production barrier of the high-quality HDR contents, Chinese and foreign scholars have begun to conduct in-depth research on this. The current HDR generation technology has made certain results. However, due to the large number of subjects involved, this field is still in the research and development stage, and there is no technology mature enough to push the further promotion of various applications.

The HDR synthesis technology can effectively reduce the production cost of the HDR contents and accelerate the development of the HDR content industry. The HDR technologies have been widely applied to video-on-demand services and live broadcast services. However, the HDR contents are expensive to produce and difficult to produce, which greatly limits the application fields of the HDR technologies. At present, most of the video resources on the market are low-dynamic range (LDR) videos. The main performance indicators of this video format are as follows:

(1) Brightness range, supporting 0.1 to 100 Nits. The supported brightness range is small.

(2) Color range, supporting BT.709 color gamut. The color range expressed is limited.

(3) Contrast, supporting 8-bit quantization. More information is lost.

Compared with users' high-quality display devices, these video resources in the LDR format cannot meet requirements of demanding users on experience. According to the existing technologies, the brightness of ordinary display devices has reached 500 Nits or even higher levels, so the contents of the LDR format can no longer meet the current development speed of the device manufacturing industry. At present, HDR10 (High-Dynamic Range) needs to support the following performance indicators:

(1) Brightness range, supporting 0.01 to 1000 Nits.

(2) Color space, supporting BT.2020 color gamut.

(3) Contrast, supporting 10 bits and above quantization.

At present, some inverse color gamut mapping methods of traditional methods and artificial intelligence methods have been developed, which can convert LDR contents into HDR contents. But most of them are mainly concentrated in the field of image shooting, so the application scope of the multi-frame synthetic HDR image technology is quite limited. In addition, decompressing and re-encoding videos more or less have information loss, and optimizing frames separately may cause the jitter problem for a continuous video.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus capable of more intuitively and simply establishing a communication connection between a user terminal and an electronic apparatus by a user terminal capturing a marker including at least one of a text or an image for guiding a user's operation output by the electronic apparatus, and a corresponding user terminal and a corresponding method of controlling thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a display, a communication interface comprising a circuitry, a memory comprising at least one instruction, and a processor configured to execute the at least one instruction, and the processor, by executing the at least one instruction, is configured to, based on an external user terminal being discovered by the electronic apparatus through the communication interface, control the display to display a marker for guiding an operation of a user to establish a communication connection between the electronic apparatus and the external user terminal, based on the external user terminal authenticating the electronic apparatus by capturing an image of the electronic apparatus displaying the marker, receive a signal confirming authentication of the electronic apparatus from the external user terminal through the communication interface, and establish a communication connection with the external user terminal through the communication interface in response to receiving the signal.

The processor is configured to control the display to display a background screen of a predefined pattern or a color along with the marker.

The processor is configured to receive information on the external user terminal through the communication interface, and based on the communication connection with the external user terminal being established, remove the marker and control the display to display the information on the external user terminal.

The electronic apparatus further includes a light outputter, and the processor is configured to control the light outputter to output light of a predefined pattern as the marker.

In accordance with another aspect of the disclosure, a user terminal is provided. The user terminal includes a camera, a display, a communication interface, a memory comprising at least one instruction, and a processor configured to execute the at least one instruction, and the processor, by executing the at least one instruction, is configured to, based on an electronic apparatus being discovered by the user terminal through the communication interface, control the display to display a menu for establishing a communication connection with the electronic apparatus, based on receiving a user input for establishing the communication connection with the electronic apparatus through the menu, activate the camera and control the display to display a screen comprising an image captured by the camera, and based on the electronic apparatus being authenticated by analyzing a marker included in the image for guiding an operation of a user to establish the communication connection with the user terminal, establish the communication connection with the electronic apparatus by transmitting a signal confirming authentication of the electronic apparatus through the communication interface.

The processor is configured to analyze at least one of a text or an image included in the maker and authenticate the electronic apparatus based on the analyzed at least one of the text or the image corresponding to at least one of a pre-stored text or a pre-stored image.

The processor is configured to authenticate the electronic apparatus by analyzing an appearance of an electronic apparatus included in the captured image along with a text and an image included in the marker and a background screen output by the electronic apparatus.

The screen may include a user interface (UI) for guiding a position of the electronic apparatus that outputs the marker.

The processor is configured to receive information on the electronic apparatus through the communication interface while discovering the electronic apparatus, and the screen may include information on the electronic apparatus along with the image.

The processor is configured to, based on a communication connection with the electronic apparatus being established, remove the image and control the display to display a message indicating that a communication connection with the electronic apparatus is completed.

In accordance with another aspect of the disclosure, a method of controlling an electronic apparatus is provided. The method includes, based on an external user terminal being discovered by the electronic apparatus, displaying a marker for guiding an operation of a user to establish a communication connection with the external user terminal, based on the external user terminal authenticating the electronic apparatus by capturing an image of the electronic apparatus displaying the marker, receiving a signal confirming authentication of the electronic apparatus from the external user terminal, and establishing a communication connection with the external user terminal in response to receiving the signal.

The displaying the marker may include displaying a background screen of a predefined pattern or a color along with the marker.

The method may include receiving information on the external user terminal, and based on the communication connection with the external user terminal being established, removing the marker and displaying information on the external user terminal.

The method may include outputting light of a predefined pattern as the marker.

In accordance with another aspect of the disclosure, a method of controlling a user terminal is provided. The method includes, based on an electronic apparatus being discovered by the user terminal, displaying a menu for establishing a communication connection with the electronic apparatus, based on receiving a user input for establishing the communication with the electronic apparatus through the menu, activating a camera of the user terminal and displaying a screen comprising an image captured by the camera, and based on the electronic apparatus being authenticated by analyzing a marker included in the image for guiding an operation of a user to establish the communication connection with the user terminal, establishing the communication connection with the electronic apparatus by transmitting a signal confirming authentication of the electronic apparatus.

The method may include analyzing at least one of a text or an image included in the marker and authenticating the electronic apparatus based on and the analyzed at least one of the text and the image corresponding to at least one of a pre-stored text or a pre-stored image.

The authenticating may include authenticating the electronic apparatus by analyzing a format of an electronic apparatus included in the captured image along with a text and an image included in the marker and a background screen output by the electronic apparatus.

The screen may include a user interface (UI) for guiding a position of the electronic apparatus that outputs the marker.

The method may include receiving information on the electronic apparatus while discovering the electronic apparatus, and the screen may include information on the electronic apparatus along with the image.

The method may include, based on a communication connection with the electronic apparatus being established, removing the image and displaying a message indicating that a communication connection with the electronic apparatus is completed.

By the diverse embodiments as described above, a user terminal may establish a communication connection between an electronic apparatus and a user terminal more intuitively and simply, by capturing by a user terminal a marker including at least one of a text or an image for guiding a user's operation output by the electronic apparatus.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
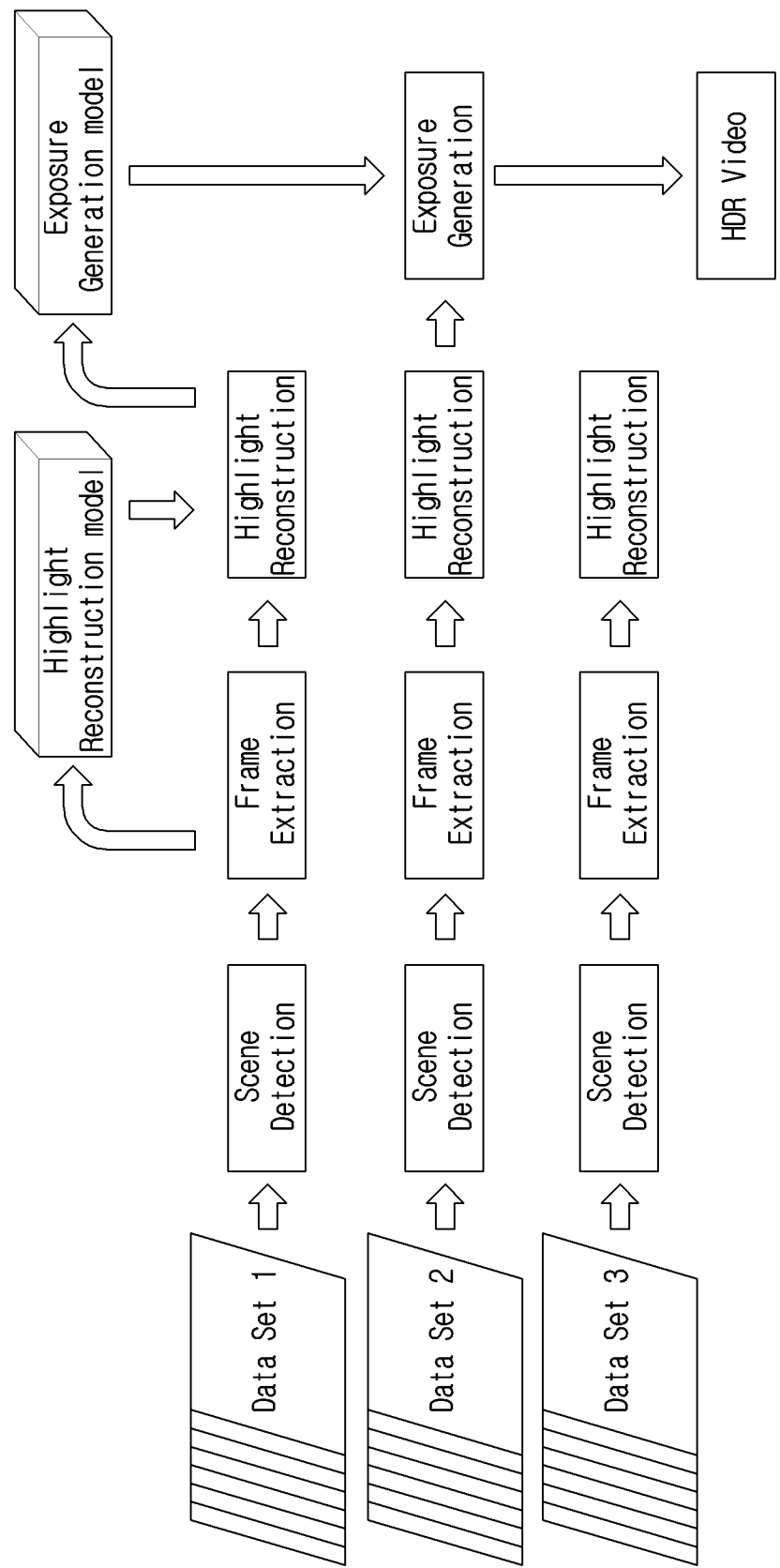
FIG. 1 is a schematic flowchart of a video mapping method according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this specification, the expressions "have," "may have," "include," or "may include" or the like represent presence of a corresponding feature (for example: components such as numbers, functions, operations, or parts) and such expressions do not exclude the presence of additional features or elements.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B.

As used herein, the terms "first," "second," or the like may denote various components, regardless of order or importance, and may be used to distinguish one component from another, and do not limit the components. For example, a first user appliance and a second user appliance may indicate different user appliances regardless of their order or importance. For example, without departing from the scope as described herein, a first element may be referred to as a second element, or similarly, a second element may be referred to as a first element.

The term such as "module," "unit," "part," and so on is used to refer to an element that performs at least one function or operation, and such element may be implemented as hardware or software, or a combination of hardware and software. Further, except for when each of a plurality of "modules," "units," "parts," and the like may be realized in an individual hardware, the components may be integrated in at least one module or chip and be realized in at least one processor. For example, a module may be composed of an application-specific integrated circuit (ASIC).

It is to be understood that an element (e.g., a first element) is "operatively or communicatively coupled with/to" another element (e.g., a second element) is that any such element may be directly connected to the other element or may be connected via another intervening element (e.g., a third element). On the other hand, when it is mentioned that an element (e.g., a first element) is "directly connected" or "directly accessed" to another element (e.g., a second element), it can be understood that there is no other intervening element (e.g., a third element) between the elements.

Also, the expression "configured to" used in the disclosure may be interchangeably used with other expressions such as "suitable for," "having the capacity to," "designed to," "adapted to," "made to," and "capable of," depending on context. Instead, under some circumstances, the expression "a device configured to" may mean that the device "is capable of" establishing an operation together with another device or component. For example, the phrase "a processor configured to establish A, B, and C" may mean a dedicated processor (e.g.: an embedded processor) for performing the corresponding operations, or a generic-purpose processor (e.g.: a central processing unit (CPU) or an application processor) that can establish the corresponding operations by executing one or more software programs stored in a memory device.

The terms used in the description are used to describe one or more embodiments, but may not intend to limit the scope of other embodiments. Unless otherwise defined specifically, a singular expression may encompass a plural expression. All terms (including technical and scientific terms) used in the description could be used as meanings commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the disclosure may not be interpreted as excluding the embodiments of the disclosure.

The disclosure will be described in greater detail below with reference to the accompanying drawings to enable those skilled in the art to implement the concepts of disclosure with ease. However, the disclosure may be implemented as several different forms and not to be limited to any of specific examples described herein. Further, in order to clearly describe the disclosure in the drawings, portions irrelevant to the description may be omitted, and throughout the description, the like elements are given the similar reference numerals.

In order to solve the problems in the prior art, the disclosure proposes a video mapping technical solution based on artificial intelligence (AI), which is used to map (also referred to as "convert") an LDR video into an HDR video. Its main idea is: generating a set of LDR images of different exposures through a convolutional neural network model by using a plurality of highlighted LDR images in a same scene in an LDR video, synthesizing the set of LDR images into HDR images, and then synthesizing the HDR images into an HDR video. In the convolutional neural network model, a time domain for constraining is added by means of multi-dimensional convolution, which optimizes the existing problem of video jitter caused due to converting LDR contents into HDR contents.

The video mapping method of the disclosure mainly includes two processes: a modeling process and a mapping process. The modeling process mainly includes the following.

Details of the two processes will be described below, respectively.

The modeling process of a video mapping method according to the disclosure includes the following operations:

Operation 1: A same scene is shot with at least three (3) different exposure levels at the same time to obtain LDR videos of at least three different exposure levels.

For example: three exposure levels may be preset, defining: ⅓ of camera aperture and shutter time limits are a low exposure level, denoted as L1; ⅔ of camera aperture and shutter time limits are a medium exposure level, denoted as L2; and 3/3 of camera aperture and shutter time limits are a high exposure level, denoted as L3.

For another example: four (4) exposure levels may be preset, defining: ¼ of camera aperture and shutter time limits are denoted as L1'; 2/4 of camera aperture and shutter time limits are denoted as L2'; ¾ of camera aperture and shutter time limits are denoted as L3'; and 4/4 of camera aperture and shutter time limits are denoted as L4'.

Of course, in practical applications, other numbers of exposure levels may be set, and the aperture and shutter time is set as needed, so that the brightness levels are divided into at least three different levels by controlling the lighting parameters of video shooting.

In some cases, the exposure level may also be referred to as brightness level.

Operation 2: scene detection is performed on the at least three LDR videos, and a frame in which a scene change occurs in the videos is marked.

In this operation, scene detection is performed on the input LDR videos to determine and mark the frame in which a scene change occurs. For example: while shooting indoors, if it is changed to outdoor shooting, a scene change occurs. Because an indoor scene and an outdoor scene have great differences in brightness, chroma and contrast, the scene change in the video needs to be determined through scene detection, and the frame in which a scene change occurs needs to be marked. Then, corresponding processing is performed in the subsequent operations, so that the dynamic range in the scene is expressed more accurately.

In this operation, the scene detection may be performed by searching for matching blocks by means of motion search, and determining whether a scene change occurs in the current frame by comparing the mean square errors of the matching blocks with a set threshold. Preferably, the matching process may be accelerated by combining a large macro block matching strategy and a diamond search algorithm.

Operation 3: frames are extracted between a start frame and an end frame of each scene according to densities from high to low.

In the disclosure, frame extraction (also referred to as: extraction) is performed based on the rule that a frame closer to the start frame in each scene contains richer dynamic range information. Frames closer to the start frame are extracted with a higher density (also referred to as: frequency), and then the densities of extracting frames gradually decrease until the end frame of the scene, thereby ensuring that enough frames can be extracted (i.e., enough information is obtained) for subsequent processing, and the complexity can be controlled within an appropriate range.

The extraction algorithm may be an equal-ratio algorithm, that is, the densities of extracting frames gradually decrease according to a geometric progression. For example, taking a multiple of 2 as the benchmark, and starting from the start frame of each scene, one frame is extracted every 1 frame, then every 2 frames, every 4 frames . . . every 2N (N is a positive integer) . . . until the end of the scene.

The equal-ratio algorithm may also not be used, but other non-geometric progressions may be set to gradually decrease the densities of extracting frames. As long as it can be ensured that frames are extracted between the start frame and the end frame of each scene according to densities from high to low.

Operation 4: the following operations are performed on each extracted frame: a highlight region is searched for in the frame, and a highlight reconstruction model is trained with a two-dimensional convolutional neural network based on the highlight region and a plurality of frames before and after the frame, to obtain a highlighted reconstructed image of the frame.

The plurality of frames before and after the frame refer to frames in the extracted frames that are in the same scene as the frame, and that are within T1 frames before the frame and T2 frames after the frame, where T1 and T2 are preset positive integers.

The purpose of the highlight reconstruction model of the disclosure in the subsequent mapping processing is to perform highlight reconstruction (also referred to as: high-light reconstruction or high-exposure reconstruction) on each frame to be processed based on the highlight region in the frame, so as to obtain a highlighted LDR image.

The key problem of learning-based highlight region reconstruction is to obtain a well-structured training data set. In the disclosure, training and verification data of different exposure levels are obtained through scene detection and data extraction modules. As mentioned in operation 1, in this process, the modeling is carried out based on at least three LDR videos shot with at least three different exposure levels. Accordingly, in operation 4, the highlight reconstruction model can be trained based on the highlight regions in the known frames of at least three different exposure levels and a plurality of frames before and after the frames, and the trained highlight reconstruction model can be used for the reconstruction of a high-exposure region in the subsequent mapping process to sharpen the high-exposure part of an image.

A brightness threshold may be set, and a region that exceeds the brightness threshold in the frame is identified as the highlight region (also referred to as the high-exposure region). For example: According to a high-exposure brightness standard, a region that has a brightness exceeding 90% higher than the brightness in the image can be defined as a highlight region.

Preferably, an Encoder-Decoder model can be selected as the highlight reconstruction model of the disclosure, and the error between the intrinsic image and the generated image is calculated with a loss function through a mean square error. Through the processing of this operation, the characteristics of the highlight region in each frame (i.e., each image) can be learned, and the content of the corresponding image can be reconstructed based on the highlight region.

Operation 5: the reconstructed images obtained are input into an exposure generation model for training according to their orders in the original LDR video, and at least three frames of different exposure levels are obtained for each reconstructed image.

The exposure levels described in this operation may be set corresponding to the exposure levels described in operation 1, or may be set independently of operation 1.

The purpose of the exposure generation model of the disclosure in the subsequent mapping processing is to perform exposure processing of different exposure levels based on each reconstructed image through the convolutional neural network, so as to obtain the at least three frames of different exposure levels corresponding to each reconstructed image.

So far, the modeling process of the disclosure is completed. In the above process, the highlight reconstruction model and the exposure generation model are obtained by using at least three LDR videos shot with at least three different exposure levels to perform training, and the two models can be used for subsequent mapping processing.

The mapping process of a video mapping method of the disclosure includes the following operations:

Operation 1: after an LDR video is decoded, it is input to the highlight reconstruction model to obtain highlighted reconstructed images of respective LDR video frames in the LDR video.

Operation 2: the highlighted reconstructed images are input to the exposure generation model to obtain at least three frames of different exposure levels corresponding to each reconstructed image.

Operation 3: the at least three frames of the different exposure levels corresponding to each reconstructed image are synthesized into a frame of HDR image, and all the HDR images are encoded in order of time and synthesized into an HDR video.

In this operation, the final HDR image is synthesized from the generated at least three images. An Encoder-Decoder model is selected as the network structure model, and the loss function is constrained by pixel loss and time domain information.

The format of the encoded video supports HEVC, and 10-bit coding, and HDR metadata is stored in SEI information, including information such as MAXCLL and MAX-FALL.

In order to optimize the jitter problem of the final synthesized HDR video, in the disclosure, a three-dimensional convolution method is adopted, in which the time domain information of the video is introduced to constrain the exposure generation model so as to smooth the frames of the synthesized video, and finally a high-dynamic range video, i.e., LDR video, is generated by encoding.

The above-mentioned technical solution of the disclosure mainly uses a two-dimensional convolutional neural network to reconstruct highlight regions of input LDR images, then uses a three-dimensional convolutional neural network to perform exposure generation of at least three different brightness levels on the images, finally synthesizes the generated images of at least three different brightness levels into HDR images, and encodes the HDR images to obtain an HDR video. Through the method provided in the disclosure, the problem that a multi-exposure synthetic image is a bit dark or light is improved. In addition, by introducing the time domain information into the exposure generation model for constraints, the jitter problem of synthetic video is improved.

Hereinafter, the technical solution of the disclosure will be further described in detail through preferred embodiments.

FIG. 1 is a schematic flowchart of a video mapping method according to an embodiment of the disclosure.

Hereinafter, the process shown in FIG. 1 is mainly described from scene detection, scene data set extraction, a highlight reconstruction model, an exposure generation model, and high-dynamic video synthesis.

Referring to FIG. 1, in the modeling stage, in this embodiment, three exposure levels L1, L2, and L3 are preset as described above for shooting to obtain three LDR videos, as shown by L1, L2, and L3 on the left of FIG. 1. Taking the three LDR videos as input, scene detection is performed first. Unless otherwise specified, in the following processing, the three LDR videos are processed respectively.

1. Scene Detection

Taking each frame of an input video as a current frame in turn, the following operations 1) to 3) are performed:

1) Matching blocks are searched for in the current frame by using a diamond search method. The diamond search method can quickly narrow the matching scope and improve the detection efficiency.

2) For each matching block, mean square errors (MSEs) between the matching block and optimum matching blocks thereof in the previous and next frames are calculated based on motion estimation.

The motion displacement of each pixel in the frame can be obtained according to the motion information between frames. The frame quality produced by motion compensation depends on the accuracy of motion vectors. A common matching criterion for searching for the optimum matching blocks is the MSE value. This method only requires subtraction and addition operations, so the calculation is simple and the amount of calculation is small.

Figure 2:
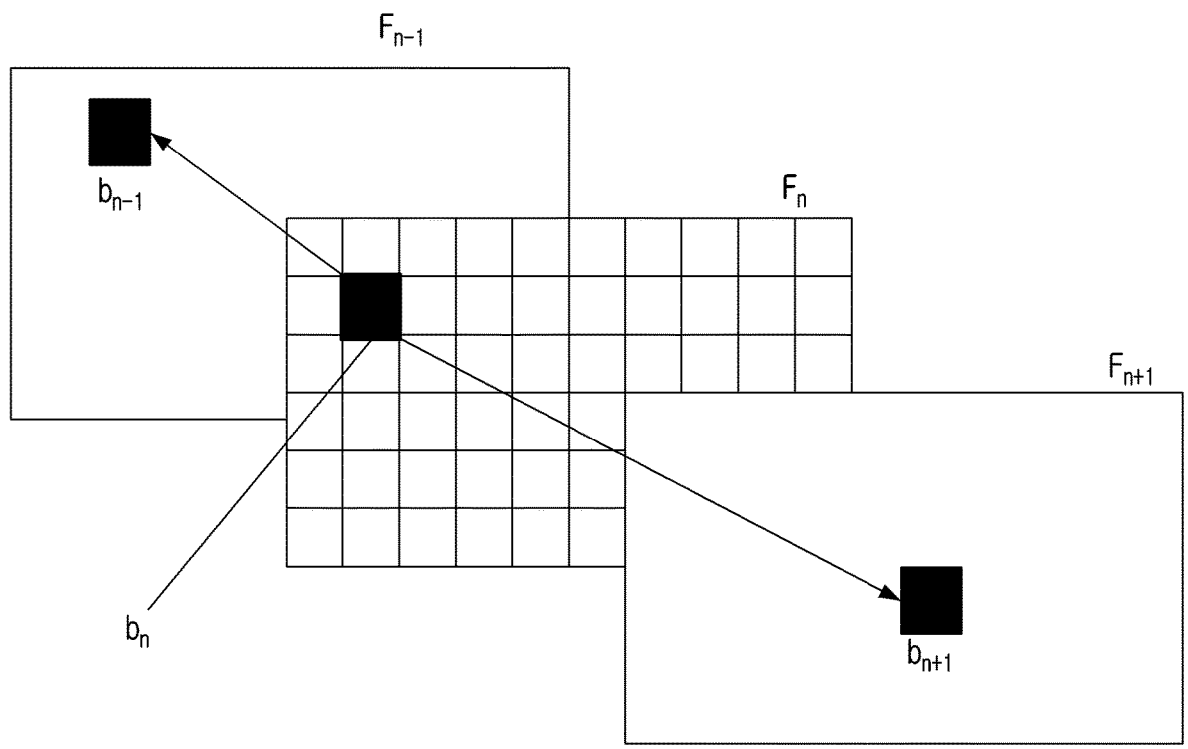
FIG. 2 is a schematic diagram of video scene detection according to an embodiment of the disclosure.

FIG. 2 is a schematic diagram of video scene detection according to an embodiment of the disclosure.

Referring to FIG. 2, bidirectional motion estimation is performed by using a block-based motion estimation search algorithm in this embodiment, where:

F(n) is the current frame;

F(n−1) and F(n+1) are original reference frames before and after the current frame;

b(n) is a matching block (also referred to as a block to be interpolated) in the current frame;

b(n−1) and b(n+1) are optimum matching blocks of b(n) found in F(n−1) and F(n+1) respectively.

3) Scene detection is performed according to the MSE values of the matching block in the current frame and the optimum matching blocks thereof in the previous and next frames to determine whether a scene change occurs.

There are several better determining methods for this operation:

(1) The sum of MSEs of b(n−1) and b(n), as well as b(n) and b(n+1) may be solved, the sum is compared with a preset threshold, and if the sum exceeds the preset threshold, it is determined that a scene change occurs in the current frame; otherwise, it is determined that the current frame and the previous frame thereof are still in the same scene.

(2) The quotient of MSEs of b(n) and b(n−1), and the quotient of MSEs of b(n) and b(n+1) may also be solved, a mean of the two quotients is calculated, the mean is compared with a preset threshold, and if the mean exceeds the preset threshold, it is determined that a scene change occurs in the current frame; otherwise, it is determined that the current frame and the previous frame thereof are still in the same scene.

The frame in which a scene change occurs can be marked out, so as to separate the video into a plurality of different scenes.

2. Scene Data Set Extraction

Figure 3:
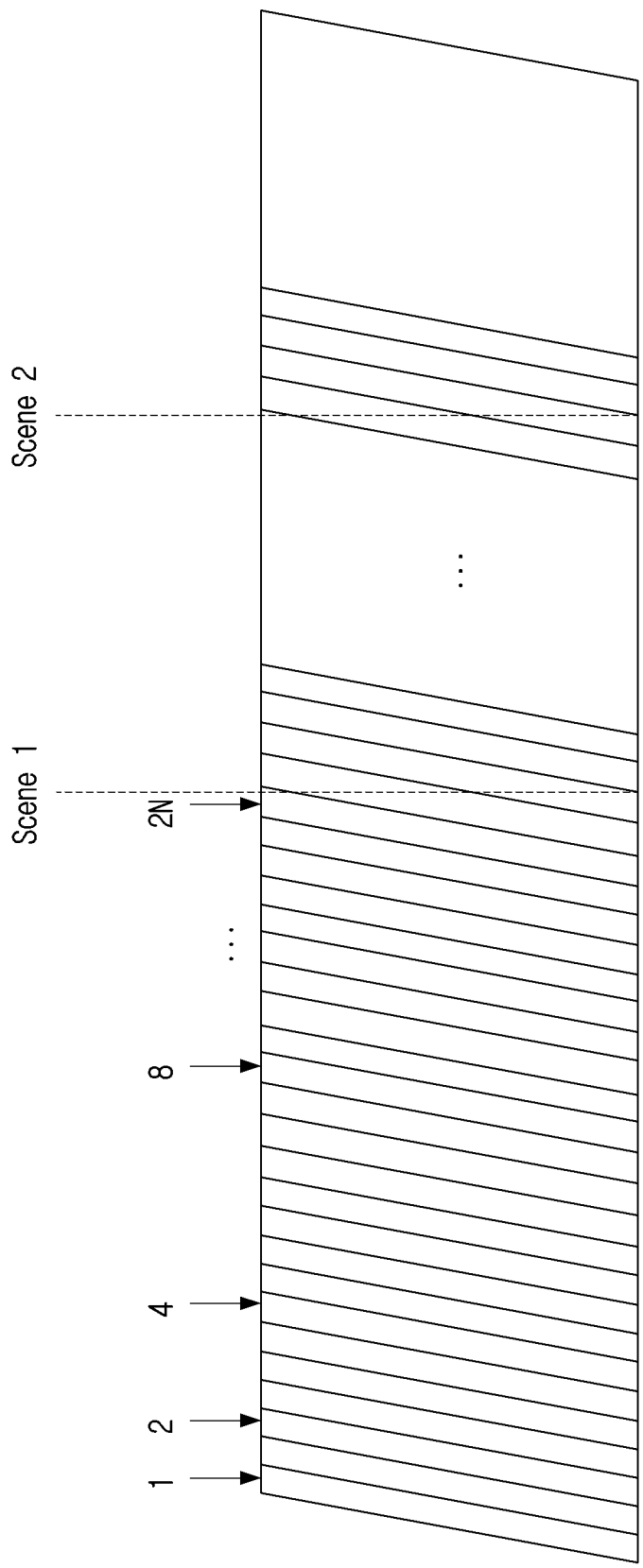
FIG. 3 is a schematic diagram of scene data set extraction according to an embodiment of the disclosure.

FIG. 3 is a schematic diagram of scene data set extraction according to an embodiment of the disclosure.

After different scenes of the input video are determined, as shown in FIG. 3, image frame data in each scene is extracted by extracting one frame every 1, 2, 4, 8, 16 . . . 2N frames starting from a start frame of each scene, with a multiple of 2 as the benchmark in this embodiment. In this way, a scene data set will be obtained, and is input to a highlight reconstruction model for modeling.

3. Highlight Reconstruction Model

For the highlight reconstruction model, in this embodiment, a convolutional autoencoder network is used, an encoder converts the LDR input into a latent feature representation, and a decoder reconstructs the latent feature representation into an HDR image in a logarithmic domain.

The translation operation includes directly displaying an LDR image as a logarithmic HDR image and initializing the fusion operation of a translation layer.

The autoencoder structure converts the input into a low-dimensional representation, and the decoder is trained to reconstruct full-dimensional data. The denoising autoencoder is trained with lossy input for the purpose of reconstructing the original lossless data. This is achieved by mapping to a higher-level representation with specific corruption remaining unchanged. In this embodiment, this concept is also adopted to reconstruct high-definition images.

Figure 4:
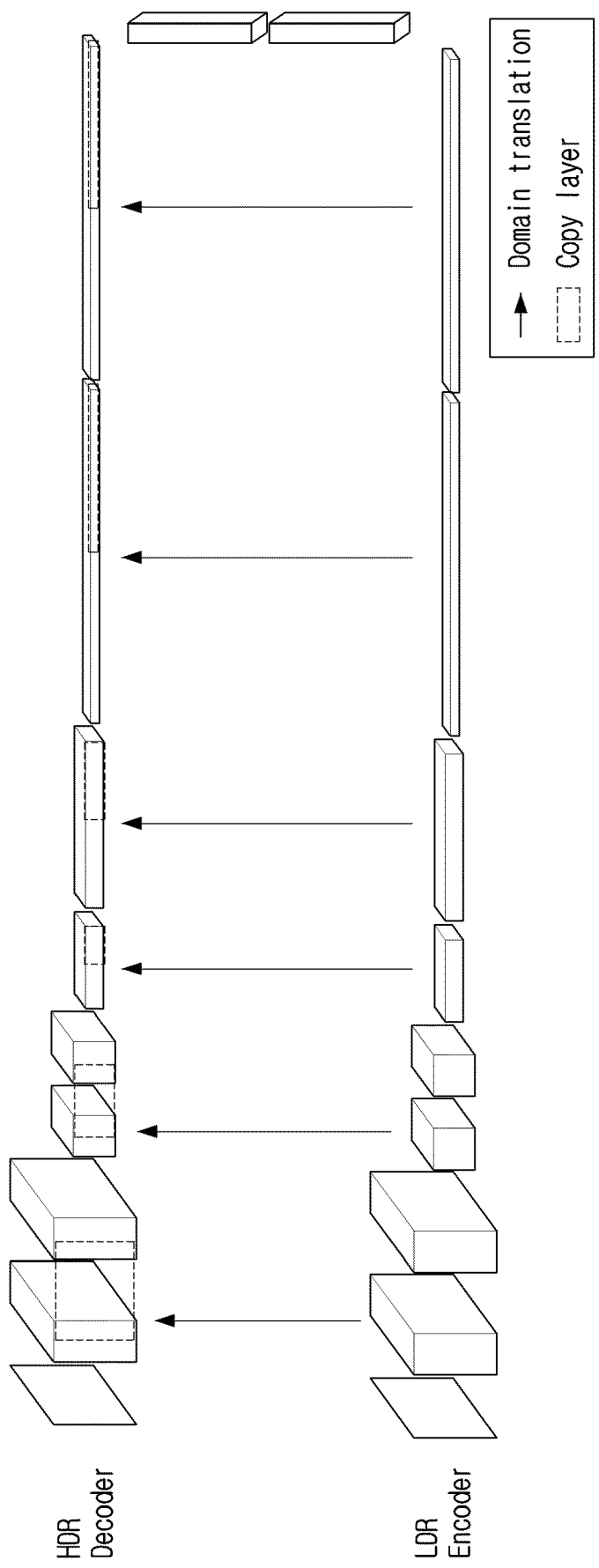
FIG. 4 is a schematic diagram of a high-brightness reconstruction model according to an embodiment of the disclosure.

FIG. 4 is a schematic diagram of a high-brightness reconstruction model according to an embodiment of the disclosure.

The complete design of the autoencoder for image exposure reconstruction in this embodiment is as shown in FIG. 4. Following a pooling layer, a convolutional layer encodes the input LDR image into a W64×H64×512 latent image representation, where: W and H are the width and height of the image, and 512 is the number of features. A common VGG16 network is used for the encoder layer. When the encoder directly operates on the LDR input image, the decoder is responsible for generating HDR data. A rectified linear unit (ReLU) activation function is used for all layers of the network, and a specification is added to each layer of the decoder to preprocess the layer.

Encoding the input image means that a lot of high-resolution information is lost in early layers of the encoder. This information may be used by the decoder to help reconstruct a high-exposure region. Accordingly, in this embodiment, a translation operation is introduced to transfer data between the high features and low features of the encoder and decoder. The translation operation from LDR to HDR is defined as:

$$v'^{E}_{i} = T(C[_{log\int v^{E}+e^{v^{D}}}]+b) \quad \text{Equation 1}$$

where: vectors $v^E$ and $v^D$ respectively represent slices on all feature channels $k \in \{1, 2, 3, \ldots, k\}$ of encoder and decoder layer tensors; i refers in particular to a pixel; b is a deviation of feature fusion; T is an activation function, and the activation function here is ReLU;

C is a 2k*k weight matrix; before the automatic coder-decoder is executed, the weight matrix and the deviation are initialized as:

$$C_0 = \begin{bmatrix} 1 & \cdots & 0 & 1 & \cdots & 0 \\ \vdots & \ddots & \vdots & \vdots & \ddots & \vdots \\ 0 & \cdots & 1 & 0 & \cdots & 1 \end{bmatrix}, b_0 = 0. \quad \text{Equation 2}$$

In the training process, these weights may be optimized to improve the smoothness of data by the translation operation. Since the linear combination of features is performed in the logarithmic domain, it corresponds to the multiplication of linear HDR data. All the information required by the decoder must be represented by intermediate encoding. Because of the reference to the previous legacy information, the image quality can be better, and original image details can also be better added in the translation operation process.

Directly using a loss function based on linear HDR values will be severely affected by high brightness values, resulting in underestimation of important differences in the brightness ranges. Accordingly, in this embodiment, the loss of the difference between the HDR image and the raw image in the logarithmic domain is used as ⅘ of the loss ratio, and the accuracy of prediction around the high-exposure region is added as ⅕ of the loss ratio, so that the perceptual error spreads roughly uniformly over the brightness ranges.

$$\text{Loss}(y|g) = \frac{4}{5}\sum_{i=0}^{n}(y_i\alpha - \log(g_i + \beta))^2 + \frac{1}{5}\sum_{i=0}^{n}(\log I_i - \log g_i)^2 \quad \text{Equation 3}$$

where: $\alpha$ and $\beta$ are bias coefficients, $g_i$ is a true value, $y_i$ is a predicted value, and $I_i$ is a high-exposure peripheral value.

4. Exposure Generation Model

Figure 5:
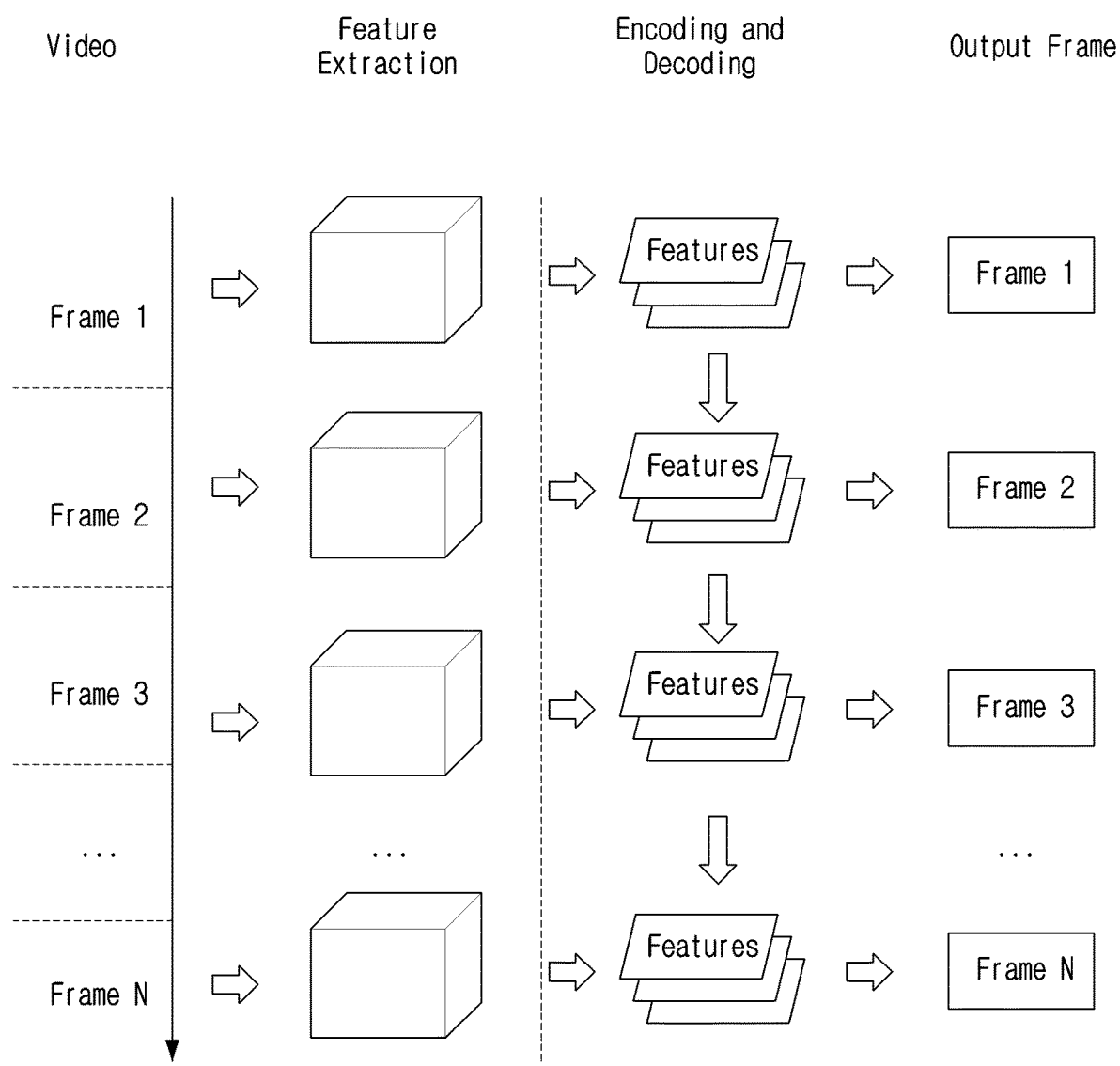
FIG. 5 is a schematic diagram of an exposure generation model according to an embodiment of the disclosure.

FIG. 5 is a schematic diagram of an exposure generation model according to an embodiment of the disclosure.

Referring to FIG. 5, in different video scene segments, in this embodiment, a three-dimensional convolutional network is used to extract spatial features of the extracted frames, then a pooling operation is performed in the time dimension, and the features are stretched to obtain feature vectors as the input of the exposure generation model. In the exposure generation model, the time dimension correlation is considered over the exposure generation model network by using the features vectors of the hidden layer obtained in each time period. Finally, a classifier is connected to the output of the hidden layer to determine whether the video is jittery or blurred.

In this embodiment, the feature vector information of the hidden layer in the time period is added to affect the final output of the exposed images, thereby determining a reasonable exposure generation image. The feature extraction for the processing of each frame may include reference frame information of this frame and a feature set of previous five frames before the frame. If the number of the previous frames is less than five, the processing is performed according to the actual number of frames, and features are directly extracted from the key frame as from the current frame. The features are encoded for the extracted feature information and the feature encoding information of the previous frame, and the feature encoding information finally generated is used in a loss function of image encoding. For example: the loss function can be calculated according to the following equation:

$$\text{Loss}(y|g) = \frac{15}{17}\sum_{i=0}^{n}(y_i\alpha - g_i\beta)^2 + \frac{1}{17}\sum_{i=0}^{n}(f^i - f^{i-1})^2 + \frac{1}{17}\sum_{i=0}^{n}(p^i) \quad \text{Equation 4}$$

where: $\alpha$ and $\beta$ are bias coefficients, $g_i$ is a true value, $f^i$ is feature information, and $p^i$ is feature encoding information.

The weights in the equation may be set according to actual needs.

Finally, the brightness of the input images is directly compressed by using a Gamma curve compression algorithm for adjusting to generate images of different exposure levels.

$$Gy = x^n (n<1) \quad \text{Equation 5}$$

where, x is a brightness value of the input image.

5. High-Dynamic Video Synthesis

The video content is processed frame by frame by using the exposure generation model. After the images of different exposure levels are generated, the exposure ratios of the images are calculated and compared according to the order of exposure level from small to large (or from large to small) to create an initial image data template. Then, a brightness curve is determined according to the data exposure ratios, the dark parts with low signal-to-noise ratios and white and bright parts of the images are removed, and then the images are weighted and synthesized into an HDR image with an exposure value of more than half (that is, L2 as described above) of that of the exposed image. A 10-bit coding technology is used for coding, and the color gamut covers BT.2020. Finally, the HDR image is subjected to video encoding by using HEVC, and the HDR information is added to the SEI information.

Figure 6:
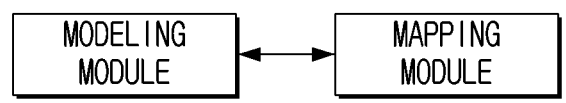
FIG. 6 is a schematic structural diagram of composition of a preferred device according to an embodiment of the disclosure.

FIG. 6 is a schematic structural diagram of composition of a preferred device of according to an embodiment of the disclosure.

Corresponding to the above method, the disclosure further provides a device for mapping an LDR video into an HDR video. Its composition structure is shown in FIG. 6, including: a modeling module; and a mapping module.

The modeling module is configured to perform training according to LDR videos of at least three different exposure levels to obtain a highlight reconstruction model and an exposure generation model;

The mapping module is configured to map an LDR video to be processed into an HDR video through the highlight reconstruction model and the exposure generation model.

Preferably, the modeling module is specifically configured to: shoot a same scene with at least three different exposure levels at a same time to obtain the LDR videos of the at least three different exposure levels; perform scene detection on the LDR videos of the at least three different exposure levels respectively, and mark a frame in which a scene change occurs in the video; extract frames from between a start frame and an end frame of each scene according to densities from high to low; perform the following operations on each extracted frame: search for a highlight region in the frame, and train a highlight reconstruction model with a two-dimensional convolutional neural network based on the highlight region and the frames before and after the frame, to obtain a highlighted reconstructed image of the frame; and train an exposure generation model with a three-dimensional convolutional neural network based on the obtained reconstructed image according to an order of the obtained reconstructed image in an original LDR video, to obtain at least three frames of different exposure levels corresponding to each reconstructed image, respectively.

Preferably, the mapping module is specifically configured to: decode the LDR video to be processed and then input the decoded LDR video to the highlight reconstruction model to obtain highlighted reconstructed images of respective LDR video frames in the LDR video; input the highlighted reconstructed images to the exposure generation model to obtain at least three frames of different exposure levels corresponding to each reconstructed image; and synthesize the at least three frames of the different exposure levels corresponding to each reconstructed image into a frame of HDR image, encode all HDR images according to a time sequence and synthesize them into the HDR video.

Described above are merely preferred embodiments of the disclosure, which are not used for limiting the disclosure. Any modification, equivalent substitution, improvement and the like made within the spirit and principle of the disclosure shall fall within the protection scope of the disclosure.

The various embodiments may be implemented with software including one or more instructions stored in the storage medium (machine-readable storage media) readable by a machine (e.g., computer). The device is a device which is operable to call one instruction among instructions stored in the storage medium and execute the instructions, and may include an electronic apparatus according to the embodiments. When the instructions are executed by a processor, the processor may establish a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the configuration in which a data is semi-permanently stored in a storage medium from the configuration in which a data is temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices. In the configuration of on-line distribution, at least a portion of the computer program product may be stored temporarily or at least temporarily in a storage medium such as a manufacturer's server, a server of an application store, or a memory of a relay server.

Each of the elements (for example, a module or a program) according to various embodiments may be composed of a single entity or a plurality of entities, and some sub-elements of the abovementioned sub-elements may be omitted. The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for mapping a low-dynamic range (LDR) video into a high-dynamic range (HDR) video, the method comprising:
   a modeling process; and
   a mapping process,
   wherein the modeling process comprises training according to LDR videos of at least three different exposure levels to obtain a highlight reconstruction model and an exposure generation model, and
   wherein the mapping process comprises:
     decoding an LDR video to be processed and inputting the decoded LDR video to the highlight reconstruction model to obtain highlighted reconstructed images of respective LDR video frames in the LDR video, inputting the highlighted reconstructed images to the exposure generation model to obtain at least three frames of different exposure levels corresponding to each reconstructed image, synthesizing the at least three frames of the different exposure levels corresponding to each reconstructed image into a frame of HDR image, and encoding all HDR images according to a time sequence and synthesizing the HDR images into an HDR video.

2. The method according to claim 1, wherein the modeling process further comprises:

shooting a same scene with the at least three different exposure levels simultaneously to obtain the LDR videos of the at least three different exposure levels, performing scene detection on the LDR videos of the at least three different exposure levels respectively, and marking frames in which a scene change occurs in the LDR videos, extracting frames between a start frame and an end frame of each scene according to densities from high to low, searching, on each of the extracted frames, for a highlight region in the frame, and training a highlight reconstruction model with a two-dimensional convolutional neural network based on the highlight region and frames before and after the frame, to obtain a highlighted reconstructed image of the frame, and training an exposure generation model with a three-dimensional convolutional neural network based on the obtained highlighted reconstructed image according to an order of the obtained highlighted reconstructed image in an original LDR video, to obtain at least three frames of different exposure levels corresponding to each reconstructed image, respectively.

3. The method according to claim 2, wherein the at least three different exposure levels comprise:

⅓ of camera aperture and shutter time limits, as a low exposure level,

⅔ of camera aperture and shutter time limits, as a medium exposure level, and

3/3 of camera aperture and shutter time limits, as a high exposure level.

4. The method according to claim 2, wherein the performing of the scene detection comprises:

searching for a matching block by a motion search, and comparing a mean square error of the matching block with a set threshold to determine whether a scene change occurs in a current frame.

5. The method according to claim 2, wherein the extracting of the frames between the start frame and the end frame comprises at least one of:

gradually reducing the densities of the extracted frames according to a geometric progression from a start frame of each scene until the end frame of the scene, or gradually reducing the densities of the extracted frames according to a set non-geometric progression from the start frame of each scene until the end frame of the scene.

6. The method according to claim 2, wherein the frames before and after the frame comprise:

frames in the extracted frames that are in the same scene as the frame, and within T1 frames before the frame and T2 frames after the frame, and wherein T1 and T2 are preset positive integers.

7. A device for mapping an LDR video into an HDR video, the device comprising:

a memory; and a at least one processor, wherein the at least one processor is configured to perform training according to LDR videos of at least three different exposure levels to obtain a highlight reconstruction model and an exposure generation model, and wherein the at least one processor is configured to:

decode an LDR video to be processed and input the decoded LDR video to the highlight reconstruction model to obtain highlighted reconstructed images of respective LDR video frames in the LDR video, input the highlighted reconstructed images to the exposure generation model to obtain at least three frames of different exposure levels corresponding to each reconstructed image, synthesize the at least three frames of the different exposure levels corresponding to each reconstructed image into a frame of HDR image, and encode all HDR images according to a time sequence and synthesize the HDR images into an HDR video.

8. The device according to claim 7, wherein the at least one processor is further configured to:

shoot a same scene with the at least three different exposure levels simultaneously to obtain the LDR videos of the at least three different exposure levels, perform scene detection on the LDR videos of the at least three different exposure levels respectively, and mark a frame in which a scene change occurs in the LDR videos, extract frames between a start frame and an end frame of each scene according to densities from high to low, search, on each of the extracted frames, for a highlight region in the frame, and train a highlight reconstruction model with a two-dimensional convolutional neural network based on the highlight region and frames before and after the frame, to obtain a highlighted reconstructed image of the frame, and train an exposure generation model with a three-dimensional convolutional neural network based on the obtained highlighted reconstructed image according to an order of the obtained highlighted reconstructed image in an original LDR video, to obtain at least three frames of different exposure levels corresponding to each reconstructed image, respectively.

* * * * *